US012778194B2

(12) United States Patent
Force

(10) Patent No.: US 12,778,194 B2
(45) Date of Patent: Nov. 3, 2026

(54) AEROSOL-GENERATING SYSTEM WITH SEPARATE CAPSULE AND VAPORIZING UNIT

(71) Applicant: Altria Client Services LLC, Richmond, VA (US)

(72) Inventor: Eric Force, Bevaix (CH)

(73) Assignee: Altria Client Services LLC, Richmond, VA (US)

( * ) Notice: Subject to any disclaimer, the term of this patent is extended or adjusted under 35 U.S.C. 154(b) by 0 days.

(21) Appl. No.: 18/064,627

(22) Filed: Dec. 12, 2022

(65) Prior Publication Data

US 2023/0112844 A1 Apr. 13, 2023

Related U.S. Application Data

(63) Continuation of application No. 16/811,415, filed on Mar. 6, 2020, now Pat. No. 11,546,971, which is a (Continued)

(30) Foreign Application Priority Data

Mar. 31, 2016 (EP) .................................... 16163362

(51) Int. Cl.
*A24F 40/42* (2020.01)
*A24F 40/10* (2020.01)

(Continued)

(52) U.S. Cl.
CPC ............ *A24F 40/42* (2020.01); *A24F 40/485* (2020.01); *H05B 3/04* (2013.01); *H05B 3/44* (2013.01);

(Continued)

(58) Field of Classification Search
None
See application file for complete search history.

(56) References Cited

U.S. PATENT DOCUMENTS 4,171,000 A * 10/1979 Uhle ..................... A61M 15/06 131/273
5,535,735 A * 7/1996 McPherson ........... A61M 16/20 131/273

(Continued)

FOREIGN PATENT DOCUMENTS

CN 203327956 U 12/2013
CN 203407519 U 1/2014

(Continued)

OTHER PUBLICATIONS

Chinese Office Action dated Sep. 28, 2023 for corresponding Chinese Patent Application No. 202110730963.7.

(Continued)

*Primary Examiner* — Thor S Campbell
(74) *Attorney, Agent, or Firm* — Harness, Dickey & Pierce, P.L.C.

(57) ABSTRACT

An aerosol-generating system may comprise a releasably connectable capsule and vaporizing unit. The capsule may comprise a reservoir for containing an aerosol-generating substrate, an opening in fluidic communication with the reservoir, and a valve configured to control a flow of the aerosol-generating substrate from the reservoir through the opening. The valve may comprise one or more resilient closing members biased towards a closed position. The vaporizing unit may comprise a transfer element and a heating element disposed in a housing. The heating element is configured to heat the aerosol-generating substrate in the transfer element. The vaporizing unit may also comprise an elongate element configured to engage with the valve to deflect the one or more resilient closing members from the (Continued)

closed position to an open position so as place the transfer element in fluidic connection with the reservoir when the capsule is connected to the vaporizing unit.

13 Claims, 12 Drawing Sheets

Related U.S. Application Data continuation of application No. 15/474,188, filed on Mar. 30, 2017, now Pat. No. 10,631,572, which is a continuation of application No. PCT/EP2017/054418, filed on Feb. 24, 2017.

(51) Int. Cl.
*A24F 40/485* (2020.01)
*H05B 3/04* (2006.01)
*H05B 3/44* (2006.01)

(52) U.S. Cl.
CPC ........ *A24F 40/10* (2020.01); *H05B 2203/014* (2013.01); *H05B 2203/021* (2013.01); *H05B 2203/022* (2013.01)

(56) References Cited

U.S. PATENT DOCUMENTS

| | | | | |
|---|---|---|---|---|
| 5,665,262 | A | 9/1997 | Hajaligol et al. | |
| 5,755,701 | A * | 5/1998 | Sarstedt | A61B 5/150732 604/86 |
| 8,314,591 | B2 | 11/2012 | Terry et al. | |
| 9,271,528 | B2 | 3/2016 | Liu | |
| 9,622,511 | B2 * | 4/2017 | Zhu | A24F 40/42 |
| 9,730,473 | B2 * | 8/2017 | Shinkawa | A24D 3/17 |
| 9,901,122 | B2 * | 2/2018 | Li | A24F 40/46 |
| 9,980,520 | B2 * | 5/2018 | Hearn | B67D 7/0294 |
| 10,064,433 | B2 * | 9/2018 | Li | H05B 3/0014 |
| 10,412,996 | B2 * | 9/2019 | Bright | A24F 40/48 |
| 11,155,402 | B2 * | 10/2021 | Caldas | B65D 77/0493 |
| 11,546,971 | B2 * | 1/2023 | Force | H05B 3/04 |
| 2010/0230833 | A1 * | 9/2010 | Kabasawa | H01M 8/04201 261/101 |
| 2012/0199663 | A1 * | 8/2012 | Qiu | A24F 40/42 239/8 |
| 2012/0279512 | A1 | 11/2012 | Hon | |
| 2013/0199528 | A1 * | 8/2013 | Goodman | A61M 15/0091 392/394 |
| 2014/0305454 | A1 | 10/2014 | Rinker et al. | |
| 2015/0007835 | A1 | 1/2015 | Liu | |
| 2015/0090280 | A1 | 4/2015 | Chen | |
| 2015/0173422 | A1 | 6/2015 | Liu | |
| 2015/0223515 | A1 * | 8/2015 | McCullough | A61K 31/352 427/2.1 |
| 2015/0242256 | A1 | 8/2015 | Morrissey | |
| 2015/0245654 | A1 | 9/2015 | Memari et al. | |
| 2015/0272218 | A1 | 10/2015 | Chen | |
| 2015/0305406 | A1 | 10/2015 | Li et al. | |
| 2015/0342256 | A1 * | 12/2015 | Chen | H05B 3/16 392/404 |
| 2015/0342258 | A1 * | 12/2015 | Chen | A24F 40/44 131/329 |
| 2016/0000147 | A1 * | 1/2016 | Li | A24F 40/485 392/404 |
| 2016/0000149 | A1 | 1/2016 | Scatterday | |
| 2016/0021933 | A1 | 1/2016 | Thorens et al. | |
| 2016/0345630 | A1 * | 12/2016 | Mironov | B32B 3/266 |
| 2016/0354561 | A1 * | 12/2016 | McCullough | A24C 5/01 |
| 2017/0048927 | A1 * | 2/2017 | Murison | A24F 40/50 |
| 2017/0064997 | A1 * | 3/2017 | Murison | A24F 40/53 |
| 2017/0099878 | A1 * | 4/2017 | Murison | A24F 15/015 |
| 2017/0105449 | A1 * | 4/2017 | Hearn | B67D 7/0294 |
| 2017/0280776 | A1 * | 10/2017 | Manca | H05B 3/44 |
| 2017/0280778 | A1 * | 10/2017 | Force | A24F 40/42 |
| 2018/0154092 | A1 * | 6/2018 | Patoret | A24F 40/42 |

FOREIGN PATENT DOCUMENTS

| | | | |
|---|---|---|---|
| CN | 102389166 | B | 2/2014 |
| CN | 103960782 | A | 8/2014 |
| CN | 203969195 | U | 12/2014 |
| CN | 104394723 | A | 3/2015 |
| CN | 104522891 | A | 4/2015 |
| CN | 204317492 | U | 5/2015 |
| CN | 104720109 | A | 6/2015 |
| CN | 204670386 | U | 9/2015 |
| CN | 104994757 | A | 10/2015 |
| CN | 105011374 | A | 11/2015 |
| CN | 205018291 | U | 2/2016 |
| EA | 13849 | | 8/2010 |
| EP | 2340729 | A1 | 7/2011 |
| EP | 2022349 | B1 | 7/2014 |
| EP | 3020292 | A1 | 5/2016 |
| GB | 2502053 | A | 11/2013 |
| GB | 2513637 | A | 11/2014 |
| GB | 2515562 | A | 12/2014 |
| KR | 10-2012-0080285 | A | 7/2012 |
| KR | 10-2012-0113519 | A | 10/2012 |
| RU | 2566914 | C1 | 10/2015 |
| TW | 2015/09316 | A | 3/2015 |
| WO | WO-2013/098395 | A1 | 7/2013 |
| WO | 2014/201432 | A1 | 12/2014 |
| WO | 2015/000180 | A1 | 1/2015 |
| WO | 2015/015431 | A1 | 2/2015 |
| WO | WO-2015/128665 | A1 | 9/2015 |
| WO | 2015/177044 | A1 | 11/2015 |
| WO | WO-2015/197627 | A1 | 12/2015 |

OTHER PUBLICATIONS

European Search Report dated Sep. 14, 2016 for corresponding European Application No. 16163362.3.

International Search Report and Written Opinion for corresponding International application No. PCT/EP2017/054418 dated Jun. 7, 2017.

European Office Action for corresponding Application No. 17 706 823.6-1006, dated Oct. 25, 2019.

Russian Notice of Allowance and Search Report for Application No. 2018137827, dated Apr. 28, 2020.

Russian Notice of Allowance and Search Report for corresponding Application No. 2018142140, dated Jun. 25, 2020.

European Search Report dated Nov. 3, 2020, issued in European Application No. 20191123.7.

First Office Action issued Oct. 28, 2020 in Chinese Application No. 201780016773.0.

First Office Action issued Nov. 2, 2020 in Chinese Application No. 201780029099.X.

Japanese Notice of Allowance and Search Report for corresponding Application No. 2018-551111, dated Mar. 1, 2021.

Office action dated Apr. 12, 2022 for corresponding U.S. Appl. No. 16/811,415.

Notice of Allowance for corresponding Russian Application No. 2020128015 dated Apr. 16, 2024.

Notice of Opposition for European Application No. 20191123.7 dated Feb. 23, 2024.

Notice of Allowance for Korean Application No. 10-2018-7029694 dated Feb. 10, 2025.

* cited by examiner

AEROSOL-GENERATING SYSTEM WITH SEPARATE CAPSULE AND VAPORIZING UNIT

CROSS-REFERENCE TO RELATED APPLICATIONS

This is a continuation of U.S. application Ser. No. 16/811,415, filed Mar. 6, 2020, which claims priority to U.S. application Ser. No. 15/474,188, filed Mar. 30, 2017, which claims priority to PCT/EP2017/054418, filed on Feb. 24, 2017, and further claims priority to EP 16163362.3, filed on Mar. 31, 2016, the entire contents of each of which are incorporated herein by reference.

BACKGROUND

Field

This disclosure relates to multi-part electrically heated aerosol-generating systems and associated devices, articles, and methods.

Description of Related Art

One type of aerosol-generating system is an electrically operated handheld aerosol-generating system. Known handheld electrically operated aerosol-generating systems include a device portion comprising a battery and control electronics, a replaceable cartridge portion comprising a supply of aerosol-generating substrate, and an electrically operated vaporizer. A cartridge comprising both a supply of aerosol-generating substrate and a vaporizer is sometimes referred to as a "cartomizer". The vaporizer typically includes a coil of heater wire wound around an elongate wick soaked with a liquid aerosol-generating substrate. The cartridge portion often forms a mouthpiece, on which an adult vaper may apply a negative pressure to draw the aerosol from the system. However, cartridges having this arrangement may be relatively expensive to produce. In part, this is because of the cost of manufacturing the vaporizer assembly.

SUMMARY

At least some example embodiments relate to a multi-part aerosol-generating system. The system may comprise a capsule and a releasably connectable vaporizing unit. The capsule comprises a distal end and a reservoir for containing an aerosol-generating substrate. The vaporizing unit comprises a housing, and a heating element and a transfer element (e.g., liquid transfer element) disposed in the housing. The heating element is configured to heat the aerosol-generating substrate (e.g., liquid aerosol-generating substrate) in the transfer element. The housing of the vaporizing unit has a proximal end, and the liquid transfer element extends beyond the proximal end of the housing. The vaporizing unit is configured such that the liquid transfer element is the first portion of the vaporizing unit to penetrate into the reservoir of the capsule as a distal end of the capsule is moved towards a proximal end of the vaporizing unit. The capsule and vaporizing unit are configured such that flow of liquid aerosol-generating substrate out of the capsule can be reduced or eliminated when the capsule is disconnected from the vaporizing unit even when the capsule still contains liquid aerosol-generating substrate.

The terms "distal," "upstream," "proximal," and "downstream" are used to describe the relative positions of components, or portions of components, of an aerosol-generating system. Aerosol-generating systems according to example embodiments have a proximal end (through which, in use, an aerosol exits the system) and an opposing distal end. The proximal end of the aerosol-generating article may also be referred to as the mouth end. In use, a negative pressure is applied to the proximal end of the aerosol-generating article in order to draw an aerosol from the aerosol-generating article. The terms upstream and downstream are relative to the direction of aerosol movement through the aerosol-generating article when a negative pressure is applied to the proximal end.

A multi-part aerosol-generating system may comprise a capsule and a vaporizing unit releasably connectable to the capsule. The capsule comprises a reservoir for containing a liquid aerosol-generating substrate, an opening in fluidic communication with the reservoir, and a valve configured to control flow of the liquid aerosol-generating substrate from the reservoir through the opening. The valve comprises one or more resilient closing members biased towards a closed position. The vaporizing unit comprises a housing, a liquid transfer element disposed in the housing, and a heating element disposed in the housing. The heating element is configured to heat the aerosol-generating substrate (e.g., liquid aerosol-generating substrate) in the liquid transfer element. The vaporizing unit also comprises an elongate element extending from a proximal end of the unit. The elongate element is configured to be received in the valve to cause the one or more resilient closing members to deflect away from the closed position and to cause the valve to open as a distal end of the capsule is moved towards the proximal end of the vaporizing unit. The liquid transfer element is placed in fluid connection with the reservoir via the opening when the valve is open.

Capsules of aerosol-generating systems are configured to contain an aerosol-generating substrate. In an example embodiment, the capsules are not refillable by an adult vaper. In contrast, the vaporizing unit comprising the heating element and the liquid transfer element may be re-used following multiple capsule replacements. Thus, by providing separate capsules and vaporizing units, the heating element and the transfer element need not be discarded or replaced every time the aerosol-generating substrate is depleted. Further, the manufacture of the one-time use aerosol-generating substrate-containing capsule can be simplified by not including the heating element and the transfer element in the capsule.

In some examples a separate cover disposable over, and securable in position relative to, the aerosol-generating substrate-containing capsule is provided. This may allow for simplified or reduced cost of manufacture of the aerosol-generating substrate-containing capsule relative to a system in which the liquid-containing portion also includes a mouthpiece portion.

Examples embodiments provide systems, articles, and assemblies that use electrical energy to heat a substrate, without combusting the substrate, to form an aerosol. The systems may be sufficiently compact to be considered handheld systems. Some examples of these systems can deliver a nicotine-containing aerosol.

The term "aerosol-generating" article, system, or assembly refers to an article, system, or assembly comprising an aerosol-generating substrate that releases volatile compounds to form an aerosol. The term "aerosol-generating substrate" refers to a substrate capable of releasing, upon heating, volatile compounds, which may form an aerosol.

Any suitable aerosol-generating substrate may be used with the systems. Suitable aerosol-generating substrates may comprise plant-based material. For example, the aerosol-generating substrate may comprise tobacco or a tobacco-containing material containing volatile tobacco flavor compounds, which are released from the aerosol-generating substrate upon heating. In addition or alternatively, an aerosol-generating substrate may comprise a non-tobacco containing material. The aerosol-generating substrate may comprise homogenized plant-based material. The aerosol-generating substrate may comprise at least one aerosol former. The aerosol-generating substrate may comprise other additives and ingredients such as flavorants. The aerosol-generating substrate may comprise nicotine. The aerosol-generating substrate may be a liquid at room temperature. For example, the aerosol-generating substrate may be a liquid solution, suspension, dispersion, or the like. In some non-limiting embodiments, the aerosol-generating substrate comprises glycerol, propylene glycol, water, nicotine, and, optionally, one or more flavorants.

The aerosol-generating substrate may be stored in a capsule according to example embodiments. The capsule comprises a reservoir for containing the aerosol-generating substrate. At least a portion of the aerosol-generating substrate stored in the reservoir may be a liquid and free-flowing. As used herein, "free-flowing" means that the liquid is not bound or sorbed to a solid substrate (e.g., the liquid is not stored in a porous material inside the capsule). In some examples, all of the aerosol-generating substrate in a reservoir of a capsule may be a free-flowing liquid. Alternatively and by way of further example, from 20% to 100% by volume of the aerosol-generating substrate in the reservoir may be a free-flowing liquid; such as from about 50% to about 100% or from about 75% to about 100%.

The capsule may comprise a housing defining the reservoir. The housing may be a rigid housing. As used herein, "rigid housing" means a housing that is self-supporting. The housing may be formed of any suitable material or combination of materials, such as a polymeric material, a metallic material, or a glass. In an example embodiment, the housing is formed by a thermoplastic material, wherein any suitable thermoplastic material may be used. One suitable thermoplastic material is acrylonitrile butadiene styrene. The material forming the housing may be selected so as to be chemically compatible with the aerosol-generating substrate.

The distal end portion of the capsule comprises an opening in communication with the reservoir through which the aerosol-generating substrate may be introduced into the reservoir during initial filling by, for example, a manufacturer or removed, such as by flowing, from the reservoir.

The capsule may comprise a port that defines the distal end portion opening of the capsule. The capsule may further comprise a sealing element for example that transversely extends across the port to seal the opening. In an example embodiment, the sealing element is pierceable. Any suitable material may be used to form a pierceable sealing element. For example, a metal foil, such as an aluminium foil, or thermoplastic elastomer may be used to form a pierceable sealing element.

The capsule may comprise an actuatable interface positioned relative to the opening to prevent the aerosol-generating material from exiting the reservoir when the capsule is not connected to the vaporizing unit, and to permit fluidic connection between the capsule and the vaporizing unit when the capsule and the vaporizing unit are connected. The interface may actuated by penetration of a proximal portion of an elongate element extending proximally from the vaporizing unit into the capsule by the application of force along a longitudinal axis of the device. The interface may comprise a valve, actuatable such that the act of connecting the capsule to the vaporizing unit causes the valve to open and disconnecting the capsule from the vaporizing causes the valve to close. For example, a proximal portion of the elongate element extending from the vaporizing unit may interact with the valve to cause the valve to open when the distal end of the capsule is moved towards a proximal end portion of the vaporizing unit along the longitudinal axis of the device. Any suitable valve may be used. For example, the valve may comprise one or more resilient closing members that are biased in a closed position. The valve may be configured to receive the elongate element such that insertion of the elongate element into the valve may cause deflection of the one or more resilient members away from the biased closed position to open the valve. Withdrawal of the elongate element from the valve results in the one or more resilient members returning to the biased closed position. In some examples, the valve comprises two resilient members that interact to close the valve. For example, the resilient members may include flattened portions that are biased to contact one another. Any commercially available one-way valves with adequate size and liquid flows may be used, including mini and micro flutter valves, duckbill valves, check valves.

The valve may be in a form of a duckbill valve that can be opened by insertion of an elongate element, such as the liquid transfer element extending from the vaporizing unit, into the valve to cause the duckbill portion to open and can be caused to close upon withdrawal of the elongate element from the valve. In an example embodiment, the elongate element extending proximally from the vaporizing unit that causes the valve to open is the liquid transfer element.

In addition or alternatively, the capsule may comprise a liquid storage material, positioned in the reservoir across the opening, to inhibit free flow of liquid aerosol-generating substrate from the reservoir out of the opening when the capsule and vaporizing unit are not connected. In such an instance, the liquid storage material may substantially or completely prevent the free flow of liquid aerosol-generating substrate out of the opening. Insertion of the liquid transfer element, such as a wick, of the vaporizing unit into the liquid storage material, results in the transfer by capillary action of the aerosol-generating substrate from the liquid storage material through the liquid transfer material into the vaporizing unit.

The distal end of the capsule may define one or more features configured to mate with one or more features of the vaporizing unit when connected. Such an end of the capsule is referred to as a "first mating end." The end of the vaporizing unit comprising complementary features is referred to as a "second mating end." In an example embodiment, at least some features of the first and second mating ends are configured to engage via an interference fit. For instance, at least one or both of the features of the first and second mating ends comprise a friction enhanced surface to facilitate maintenance of secure engagement between the capsule and the vaporizing unit.

The capsule may include a baffle that can move from a first extended position to a second retracted position. In the extended position, the baffle extends distally beyond one or more features of the first mating end of the capsule. When the baffle is in the retracted position, one or more features of the first mating end extend distally beyond the baffle for interaction with one or more features of the second mating end of the vaporizing unit. The baffle may define one or more openings, for example longitudinally aligned with the one or more features of the first mating end, through which the one or more features may extend when the baffle is in the retracted position. The baffle, if present, may be biased in the extended position, and the application of force to move the first mating end of the capsule towards the second mating end of the vaporizing unit, for example along a longitudinal axis of the device, may cause the baffle to move to the retracted position.

The capsule is releasably connectable to the vaporizing unit. As used herein, “releasably connectable” means that the releasably connectable parts may be connected to, and disconnected from each other, without significantly damaging either part. The capsule may be connected to the vaporizing unit in any suitable manner, such as threaded engagement, snap-fit engagement, interference-fit engagement, magnetic engagement, or the like. In some examples, the capsule is connected to the vaporizing unit by rotation, such as with a threaded engagement, but the liquid transfer element of the vaporizing unit is placed in fluidic communication with liquid aerosol-generating substrate in the reservoir of the capsule by movement in a straight line along an axis, as opposed to rotational movement about the axis, when the capsule and vaporizing unit are connected.

The vaporizing unit may comprise a housing, a heating element disposed in the housing, and a liquid transfer element disposed in the housing. The housing may comprise one or more parts. The housing may define a second mating end having one or more features configured to engage one or more features of a first mating end of the capsule. The liquid transfer element may extend beyond a proximal end or second mating end of the housing. The liquid transfer element is configured to extend to be in fluidic communication with the reservoir. For example, the liquid transfer element may extend into the reservoir beyond the interior surface when the when the capsule and the vaporizing unit are connected to cause the liquid aerosol-generating substrate to be transferred from the reservoir to the liquid transfer element.

The liquid transfer element may comprise any suitable liquid transfer material. A “liquid transfer material” is a material that conveys liquid from one end of the material to another. The liquid transfer element may actively convey liquid, for example by capillary action. The liquid transfer material may have a fibrous or spongy structure. In an example embodiment, the liquid transfer material includes a web, mat, or bundle of fibers. The fibers may be generally aligned to convey the liquid in the aligned direction. Alternatively, the liquid transfer material may comprise sponge-like or foam-like material. The liquid transfer material may comprise any suitable material or combination of materials. Examples of suitable materials are a sponge or foam material, ceramic- or graphite-based materials in the form of fibers or sintered powders, a fibrous material, for example made of spun or extruded fibers, or ceramic or glass. The portion of the liquid transfer element that extends beyond the proximal end of the housing of the vaporizing unit may comprise a felt material.

The liquid transfer element of the vaporizing unit may comprise different liquid transfer materials at different portions of the liquid transfer element. For example, the liquid transfer element may comprise a first portion that extends beyond the proximal end of the housing and a second portion that is in contact with the first portion, where the first and second portions comprise one or more different liquid transfer materials. Alternatively, the liquid transfer element may comprise one liquid transfer material or combination of liquid transfer materials throughout the element. The second liquid transfer material, if present, is suitable for use in contact with a heating element. For example, the second liquid transfer material may comprise a glass or ceramic material, for example fused silica.

In some examples, the liquid transfer element that extends beyond the proximal end of the housing of the vaporizing unit is configured to contact liquid transfer material, or liquid storage material, disposed in the reservoir of the capsule when the capsule and vaporizing unit are connected. Liquid aerosol-generating substrate may be thus transferred from the liquid storage material in the reservoir to the liquid transfer material of the liquid transfer element of the vaporizing unit. The liquid storage material in the reservoir may be a layer of high retention material. In a non-limiting embodiment, the portion of the liquid transfer element that extends beyond the proximal end of the housing of the vaporizing unit extends into, but not beyond, the layer of high retention material in the reservoir when the capsule and vaporizing unit are connected. Thus, when the capsule and vaporizing unit are disconnected, the layer of high retention material in the reservoir maintains sufficient structural integrity to prevent a free flow of liquid aerosol-generating substrate out of the reservoir, if any liquid aerosol-generating substrate remains in the reservoir.

If the capsule comprises a valve, the vaporizing unit may comprise an element that interacts with the valve or a component operably coupled to the valve to cause the valve to open when the capsule is connected to the vaporizing unit. In an example embodiment, the element that interacts with the valve or component is an elongate element, such as the liquid transfer element, that extends beyond the proximal end of the housing of the vaporizing unit. The valve may comprise one or more resilient closing members biased in a closed position and configured to receive the elongate member extending from the vaporizing unit to open the valve. Commercially available one-way valves with adequate size and liquid flows may be used, including mini and micro flutter valves, duckbill valves, check valves. The valve may comprise a resilient member and may be configured to close upon removal of the elongate member (e.g., a duckbill valve). In an example embodiment, no liquid storage material (e.g., absorbent material) is disposed in the reservoir. Such an arrangement may allow all or substantially all of the liquid aerosol-generating substrate to be consumed from the capsule before replacement is necessary.

The vaporizing unit may include a baffle that can move from a first extended position to a second retracted position. In the extended position, the baffle extends proximally beyond one or more features of the second mating end of the vaporizing unit or beyond the liquid transfer element that extends beyond the proximal end of the housing. When the baffle is in the retracted position, one or more features of the second mating end or the liquid transfer element extend proximally beyond the baffle for interaction with one or more features of the first mating end of the capsule or for entry beyond an inner surface of the reservoir of the capsule. The baffle may define one or more openings longitudinally aligned with the one or more features of the second mating end or liquid transfer element through which the one or more features or liquid transfer element may extend when the baffle is in the retracted position. The baffle, if present, may be biased in the extended position, and an application of force to move the first mating end of the capsule towards the second mating end of the vaporizing unit along an axis may cause the baffle to move to the retracted position.

In addition or alternatively, the vaporizing unit may comprise a sheath disposed about the liquid transfer element that extends beyond the proximal end of the housing. The sheath may substantially prevent the liquid transfer element from coming into contact with an adult vaper during replacement of the capsule. The sheath extends beyond the proximal end of the housing and beyond the proximal end of liquid transfer element. The sheath may be retractable to a position that permits the liquid transfer element to be placed in fluidic communication with aerosol-generating substrate when the capsule and the vaporizing unit are connected. In an example embodiment, the sheath is biased in an extended configuration and an application of force to move the distal end of the capsule towards the proximal end of the vaporizing unit along an axis causes the sheath to adapt the retracted configuration. In some examples, the sheath is the elongate element extending proximally from the vaporizing unit that interacts with a valve of the capsule to cause the valve to open. The sheath may define a distal opening through which the liquid transfer element may extend when retracted or through which liquid aerosol-generating substrate may flow to contact the liquid transfer element retained in the sheath. In some examples, an elongate member positioned alongside of the liquid transfer element interacts with the valve to cause the valve to open.

At least a portion of the liquid transfer element is located sufficiently close to the heating element so that liquid aerosol-generating substrate carried by the liquid transfer material may be heated by the heating element to generate an aerosol. At least a portion of the liquid transfer element is in thermal contact (e.g., physical contact) with the heating element.

Any suitable heating element may be employed. For example, the heating element may comprise a resistive filament. The term "filament" is an electrical path arranged between two electrical contacts. A filament may arbitrarily branch off and diverge into several paths or filaments, respectively, or may converge from several electrical paths into one path. A filament may have a round, square, flat, or any other form of cross-section. A filament may be arranged in a straight or curved manner. One or more resistive filament may form a coil, mesh, array, fabric, or the like. Application of an electric current to the heating element results in heating due to the resistive nature of the element. In some non-limiting embodiments, the heating element forms a coil that is wrapped around a portion of the liquid transfer element.

A heating element may comprise any suitable electrically resistive filament. For example, a heating element may comprise a nickel-chromium alloy.

The housing of the vaporizing unit may be a rigid housing. In a non-limiting embodiment, at least a portion of the housing may comprise a thermoplastic material, a metallic material, or a combination of a thermoplastic material and a metallic material. The housing may also comprise a material that efficiently conducts thermal energy and thus can act as a heat sink for the aerosolizing unit.

The housing may define one or more air inlets to allow air to be drawn into the aerosolizing unit to entrain aerosol resulting from the heating of the aerosol-generating substrate. The aerosol containing air may then be guided along the capsule or through a passage in the capsule to the mouth end of the system. Alternatively, or additionally, another part of the system may comprise one or more air inlets in communication with a passage that is in communication with a passage through the vaporizing unit.

The vaporizing unit may comprise electrical contacts exterior to, exposed through, or formed from a portion of the housing for electrically coupling the heating element to the power supply or other control electronics in another part of the system. The contacts may be exposed at a distal end portion, such as the distal face of the vaporizing unit for operable connection to another part of the system such as a part comprising the power supply (typically a battery). In some examples, the housing of the vaporizing unit effectively forms the contacts. The heating element may be electrically coupled to the contacts by any suitable electrical conductor. The contacts may be formed of any suitable electrically conductive material. For example, the contacts may comprise nickel- or chromium-plated brass.

The vaporizing unit may be releasably connectable to another part of the system, such as a part that comprises a power supply. The vaporizing unit may be connected to the other part in any suitable manner, such as threaded engagement, t, snap-fit it engagement, interference-fit engagement, magnetic engagement, or the like.

Aerosol-generating systems according to example embodiments may comprise a part comprising a power supply. A part comprising a power supply is also referred to as a "battery assembly" in the present disclosure. However, it will be understood that the power supply need not be a battery. The battery assembly may comprise a housing in which the power supply is disposed. The battery assembly may also comprise electronic circuitry disposed in the housing and electrically coupled to the power supply. The battery assembly may comprise contacts exterior to, exposed through, or formed from a portion of the housing such that the contacts of the battery assembly electrically couple with the contacts of the vaporizing unit when the battery assembly is connected with the vaporizing unit. The contacts may be exposed at a proximal end portion, such as the proximal face of the battery assembly for operable connection to the vaporizing unit. In some examples, the housing of the battery assembly effectively forms the contacts. The contacts of the battery assembly may be electrically coupled to the electronic circuitry and power supply. Thus, when the battery assembly is connected to the vaporizing unit, the heating element is electrically coupled to the power supply and circuitry of the battery assembly.

The electronic circuitry is configured to control the delivery of an aerosol resulting from heating of the substrate. Control electronic circuitry can be provided in any suitable form and may, for example, include a controller or a memory and a controller. The controller can include one or more of an Application Specific Integrated Circuit (ASIC) state machine, a digital signal processor, a gate array, a microprocessor, or equivalent discrete or integrated logic circuitry. Control electronic circuitry can include memory that contains instructions that cause one or more components of the circuitry to carry out a function or aspect of the control circuitry. Functions attributable to control circuitry in this disclosure can be embodied as one or more of software, firmware, and hardware.

The electronic circuitry may be configured to monitor the electrical resistance of the heating element or of one or more filaments of the heating element, and to control the supply of power to the heating element dependent on the electrical resistance of the heating element or the one or more filaments.

The electronic circuitry may comprise a microprocessor, which may be a programmable microprocessor. The electronic circuitry may be configured to regulate a supply of power. The power may be supplied to the heater element in the form of pulses of electrical current.

The battery assembly may include a switch to activate the system. For example, the battery assembly may include a button that can be depressed to activate or optionally deactivate the system.

The power supply is typically a battery, but may be or comprise another form of charge storage device such as a capacitor.

The housing of the battery assembly is a rigid housing. Any suitable material or combination of materials may be used for forming the rigid housing. Examples of suitable materials include metals, alloys, plastics or composite materials containing one or more of those materials, or thermoplastics that are suitable for food or pharmaceutical applications, for example polypropylene, polyetheretherketone (PEEK), acrylonitrile butadiene styrene and polyethylene.

The housing of the battery assembly may define one or more air inlets and one or more passages in communication with the inlets. The one or more passages may be in communication with a passage through the vaporizing unit to allow air to flow from the inlets and through the vaporizing unit.

An aerosol-generating system may include a cover that is disposable over at least the capsule. For example, the cover includes a distal end opening that is configured to receive the capsule. The cover may also extend over at least a portion of the vaporizing unit, and may also extend over at least a portion of the battery assembly. In non-limiting embodiments, the cover extends over the capsule and the vaporizing unit and abuts a proximal end of the battery assembly. Alternatively, the cover may extend over the capsule and abut a proximal end of the vaporizing unit. The cover is releasably securable in a position relative to at least the capsule. The cover may be releasably connectable to the capsule, the vaporizing unit, or the battery assembly to be retained in a position relative to the capsule. The cover may be connected to the capsule, vaporizing unit, or battery assembly in any suitable manner, such as threaded engagement, snap-fit engagement, interference-fit engagement, magnetic engagement, or the like. In some examples, securing of the cover to, for example, the battery assembly may serve to secure the capsule and vaporizing unit in place in the system.

The cover may ensure proper alignment or proper seating of the capsule with the vaporizing unit, and may ensure proper alignment or proper seating of the vaporizing unit with the battery assembly. The cover may define an inner surface configured to engage an outer surface of the capsule when the cover is secured in place relative to the capsule. For example, the cover may comprise a side wall having longitudinal features such as detents or indents that interact with complementary features, such as indents or detents, on the outer surface of the capsule. Inner surface features may interact with outer surface features of the vaporizing unit and can thus ensure proper orientation of the capsule and the vaporizing unit. In some examples, the capsule may form an inner shoulder that can contact the capsule at a proximal end portion to press the capsule in place relative to the vaporizing unit, and optionally can press the vaporizing unit into place relative to the battery assembly. In addition or alternatively, a biasing element such as a spring may be disposed in the cover. The biasing element may contact the capsule at a proximal end portion to press the capsule in place relative to the vaporizing unit, and optionally can press the vaporizing unit into place relative to the battery assembly.

If the cover extends over air inlets of, for example, the battery assembly or the vaporizing unit, a sidewall of the cover may define one or more air inlets to allow air to enter the inlets of the battery assembly or the inlets of the vaporizing unit.

The cover may define the mouth end of the aerosol-generating system. In an example embodiment, the cover is generally cylindrical and tapers inwardly towards the mouth end. The cover may be formed as a single part. The cover may include a distal part and a releasable connectable proximal part that may serve as a mouthpiece. The cover may define a mouth-end opening to allow aerosol resulting from heating of the aerosol-generating substrate to exit the device. The cover may comprise a seal to prevent air other than air containing aerosol from exiting the mouth end of the device.

The cover may comprise an elongate housing. The cover may be substantially rigid. The housing may comprise any suitable material or combination of materials. Examples of suitable materials include metals, alloys, plastics, ceramic, glass, or composite materials containing one or more of those materials, or thermoplastics, for example polypropylene, polyetheretherketone (PEEK) and polyethylene.

An aerosol-generating system according to example embodiments, when all parts are connected, may have any suitable size. For example the system may have a length from about 50 mm to about 200 mm. In another instance, the system has a length from about 100 mm to about 190 mm. Furthermore, the system may have a length from about 140 mm to about 170 mm.

All scientific and technical terms used herein have meanings commonly used in the art unless otherwise specified. The definitions provided herein are to facilitate understanding of certain terms used frequently herein.

As used herein, the singular forms “a”, “an”, and “the” encompass embodiments having plural referents, unless the content clearly dictates otherwise.

As used herein, “or” is generally employed in its sense including “and/or” unless the content clearly dictates otherwise. The term “and/or” means one or all of the listed elements or a combination of any two or more of the listed elements.

As used herein, “have”, “having”, “include”, “including”, “comprise”, “comprising” or the like are used in their open ended sense, and generally mean “including, but not limited to”. It will be understood that “consisting essentially of”, “consisting of”, and the like are subsumed in “comprising,” and the like.

BRIEF DESCRIPTION OF THE DRAWINGS

Reference will now be made to the drawings, which depict one or more aspects described in this disclosure. However, it will be understood that other aspects not depicted in the drawings fall within the scope and spirit of this disclosure. Like numbers used in the figures refer to like components, steps and the like. However, it will be understood that the use of a number to refer to a component in a given figure is not intended to limit the component in another figure labeled with the same number. In addition, the use of different numbers to refer to components in different figures is not intended to indicate that the different numbered components cannot be the same or similar to other numbered components. The schematic drawings are not necessarily to scale and are presented for purposes of illustration and not limitation.

DETAILED DESCRIPTION

Figure 1A:
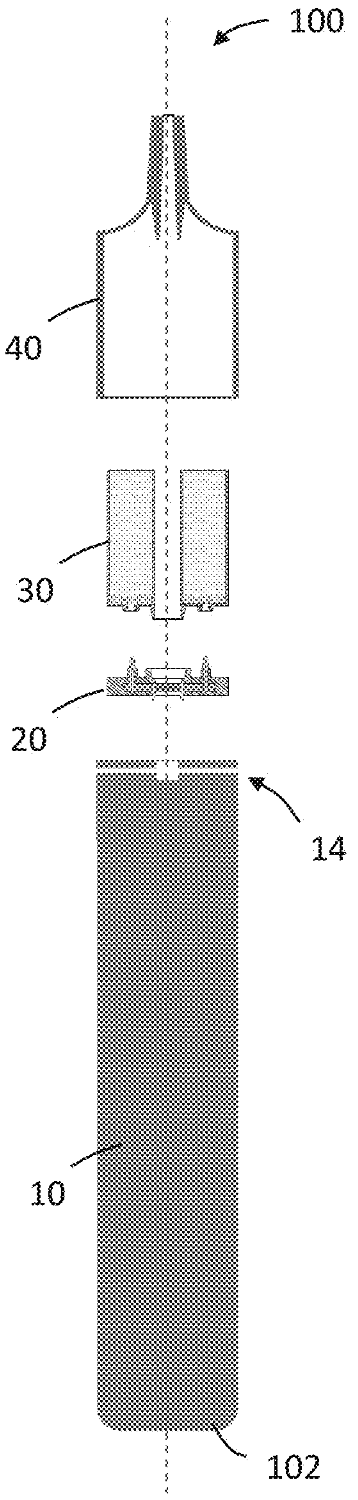
FIGS. 1A-C are schematic sectional views of an aerosol-generating system according to an example embodiment, wherein the parts are disconnected (FIG. 1A), some parts are connected and some are disconnected (FIG. 1B), and all parts are connected (FIG. 1C).

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 1B:
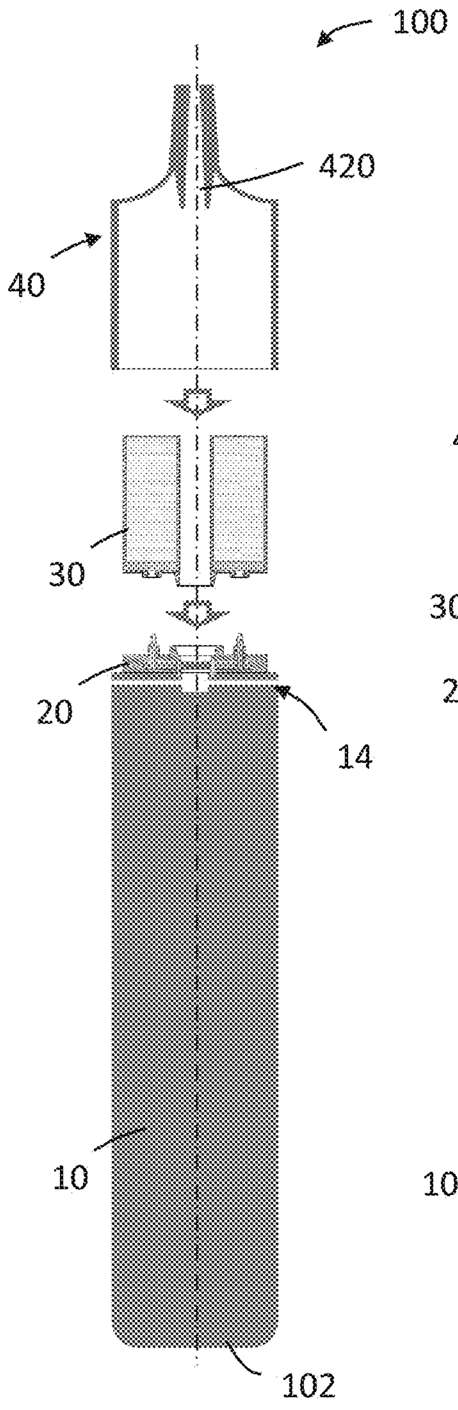
Figure 1C:
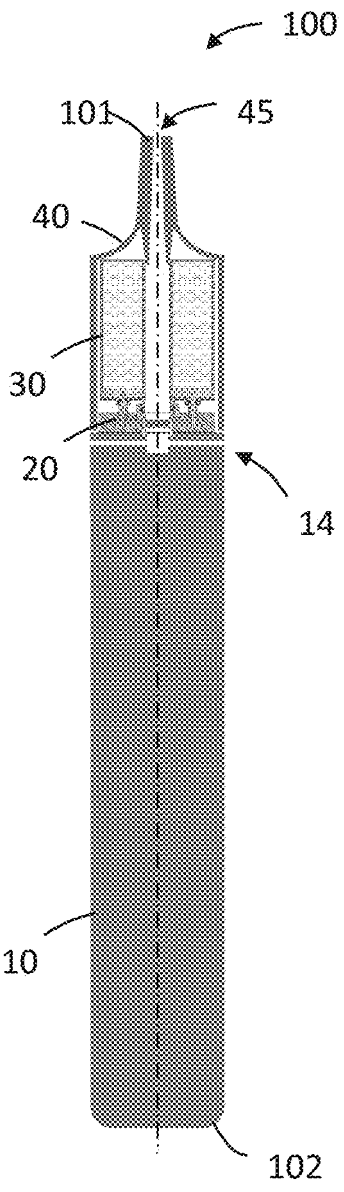

Referring now to FIGS. 1A-C, an aerosol-generating system 100 includes a battery assembly 10, a vaporizing unit 20, a capsule 30, and a cover 40. The battery assembly 10 is releasably connectable to the vaporizing unit 20. The vaporizing unit 20 is releasably connectable to the capsule 30. The cover 40 is disposable over the vaporizing unit 20 and the capsule 30. The cover 40 is releasable securable in a position relative to the vaporizing unit 20 and the capsule 30. In some examples, the cover may be releasably connectable to the battery assembly and, when the cover is connected to the battery assembly, the cover aids in retaining the vaporizing unit and capsule in place.

The system has a distal end 102 and a mouth end 101. The battery assembly 10 comprises a housing defining air inlets 14 and a passage in communication with the air inlets 14. When a negative pressure is applied to the mouth end 101, air may be drawn through air inlets 14 and a passage in the housing of the battery assembly 10, through a passage in vaporizing unit 20, through a passage in capsule 30, through a passage in cover 40, and out of mouth-end opening 45 of the cover 40.

The cover 40 in the depicted embodiment has an inwardly extending, elongate annular element 420 that defines a passage for flow of aerosol. The annular element 420 sealingly engages with the capsule 30 to place the passage through the capsule 30 in communication with the passage through the cover 40.

Figure 2A:
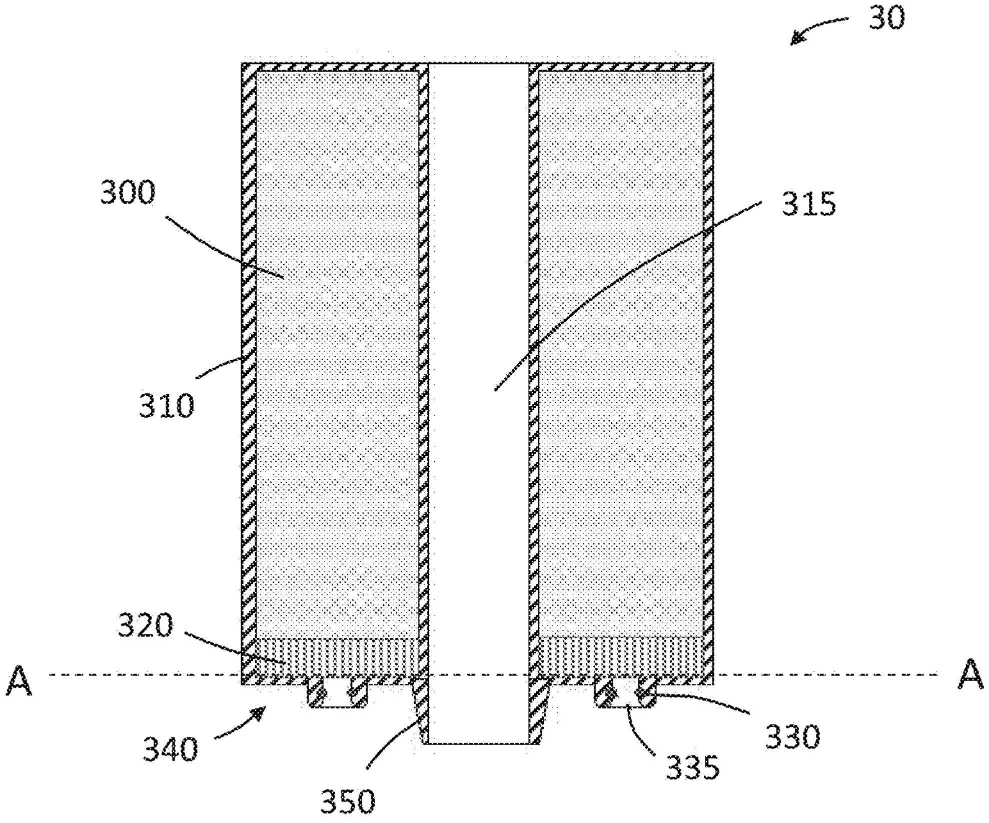
FIG. 2A is a schematic sectional view of a capsule according to an example embodiment.

Referring now to FIG. 2A, a capsule 30 may include a housing 310 defining a reservoir 300 for containing liquid aerosol-generating substrate and defining a passage 315 for aerosol flow. The capsule may include one or more ports 330 in communication with reservoir 300, and may include a sealing element 335 sealed across an opening of the port 330. The sealing element 335 is pierceable. The capsule includes a first mating end 340 at its distal end. The first mating end 340 may include a number of features for cooperating with the vaporizing unit. For example, the capsule 30 includes a longitudinally extending annular member 350 having an outer tapered surface configured to be received by a complementary feature of the vaporizing unit (not shown in FIG. 2A). Annular member 350 may be tapered at an angle from about 3 degrees to about 4 degrees.

The capsule 30 may include a layer of high retention material 320 disposed across openings in communication with the ports 330. The high retention material 320 is disposed within the reservoir. In the depicted example, the high retention material 320 is disposed on the bottom interior surface of the reservoir, which bottom surface is indicated by line A-A.

Figure 2B:
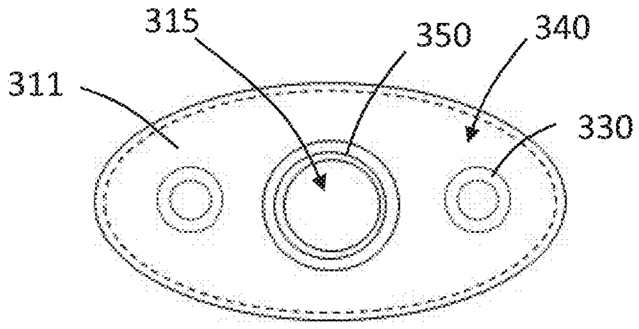
FIG. 2B is a schematic end view of a bottom surface of the capsule depicted in FIG. 2A.

Referring now to FIG. 2B, an end view of the first mating end 340 of the capsule of FIG. 2A is shown. The first mating end 340 includes a plate 311 supporting various features of the first mating end. The plate 311 may be formed from a single piece with the sidewalls of the housing (for example, housing 310 in FIG. 2A) or may be formed of one or more separate pieces connected to the sidewall of the housing. The plate 311 defines openings around which ports 330 are disposed. The plate 311 defines an opening in communication with passage 315 through which aerosol may flow. The opening is surrounded by the longitudinally extended annular member 350.

Figure 3A:
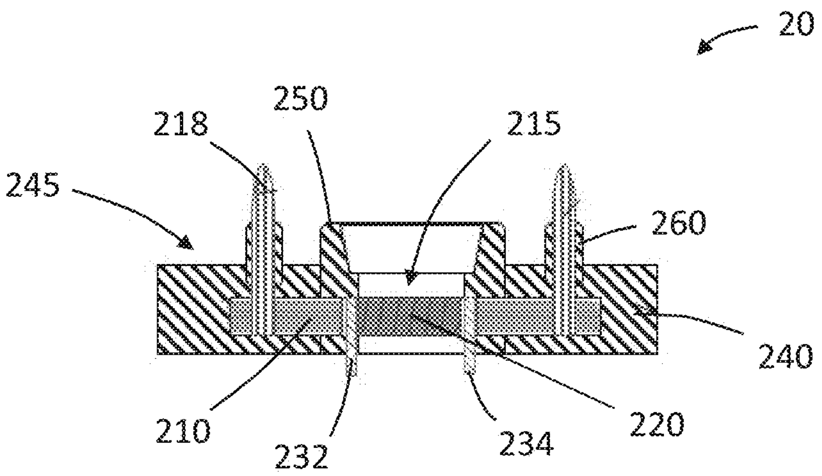
FIG. 3A is a schematic sectional view of a vaporizing unit according to an example embodiment.

Referring now to FIG. 3A, a vaporizing unit 20 may comprise a housing 240 defining a passage 215 through which aerosol may flow. A liquid transfer element 210 and heating element 220 are disposed in the housing 240. The liquid transfer element 210 is in contact with heating element 220, which is configured to heat liquid aerosol-generating substrate that is carried by the liquid transfer element 210 to form an aerosol. The aerosol may then be carried through passage 215. The heating element 220 is electrically coupled to electrodes 232, 234 that extend distally beyond the housing 240 for electrical connection with the battery assembly.

The vaporizing unit 20 has a second mating end 245 that includes features complementary to features of the first mating end of the capsule to ensure proper alignment and connection of the parts. For example, the vaporizing unit 20 includes an annular member 250 having a tapered inner surface configured to receive a corresponding annular member of the capsule 30 (for example, annular member 350 of the capsule 30 depicted in FIG. 2A). The vaporizing unit 20 also includes longitudinally extending annular member 260 through which protruding portions of the liquid transfer elements 218 extend. Annular members 260 may cooperate with corresponding features of a first mating end of capsule (such as ports 330 depicted in FIG. 2A). The protruding portions of the liquid transfer elements 218 are in communication with the portion of the liquid transfer element 210 that is in contact with heating element 220.

Figure 3B:
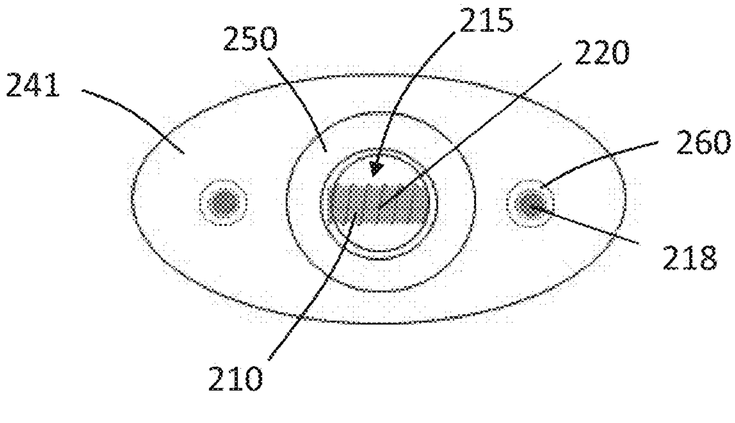
FIG. 3B is a schematic end view of a bottom surface of the vaporizing unit depicted in FIG. 3A.

Referring now to FIG. 3B, an end view of the second mating end of the vaporizing unit of FIG. 3A is shown. The second mating end includes a plate 241 supporting various features of the second mating end. The plate 241 forms a portion of the housing of the vaporizing unit 20 (for example, housing 240 in FIG. 3A). The plate 241 defines openings around which annular elements 260 are disposed. The protruding portions of the liquid transfer elements 218 extend through the annular elements 260. The plate 241 defines an opening in communication with passage 215 through which air or aerosol may flow. The opening is surrounded by the longitudinally extended annular member 250. Heating element 220 and liquid transfer element 210 are disposed in a flow path through passage 215.

Figure 4:
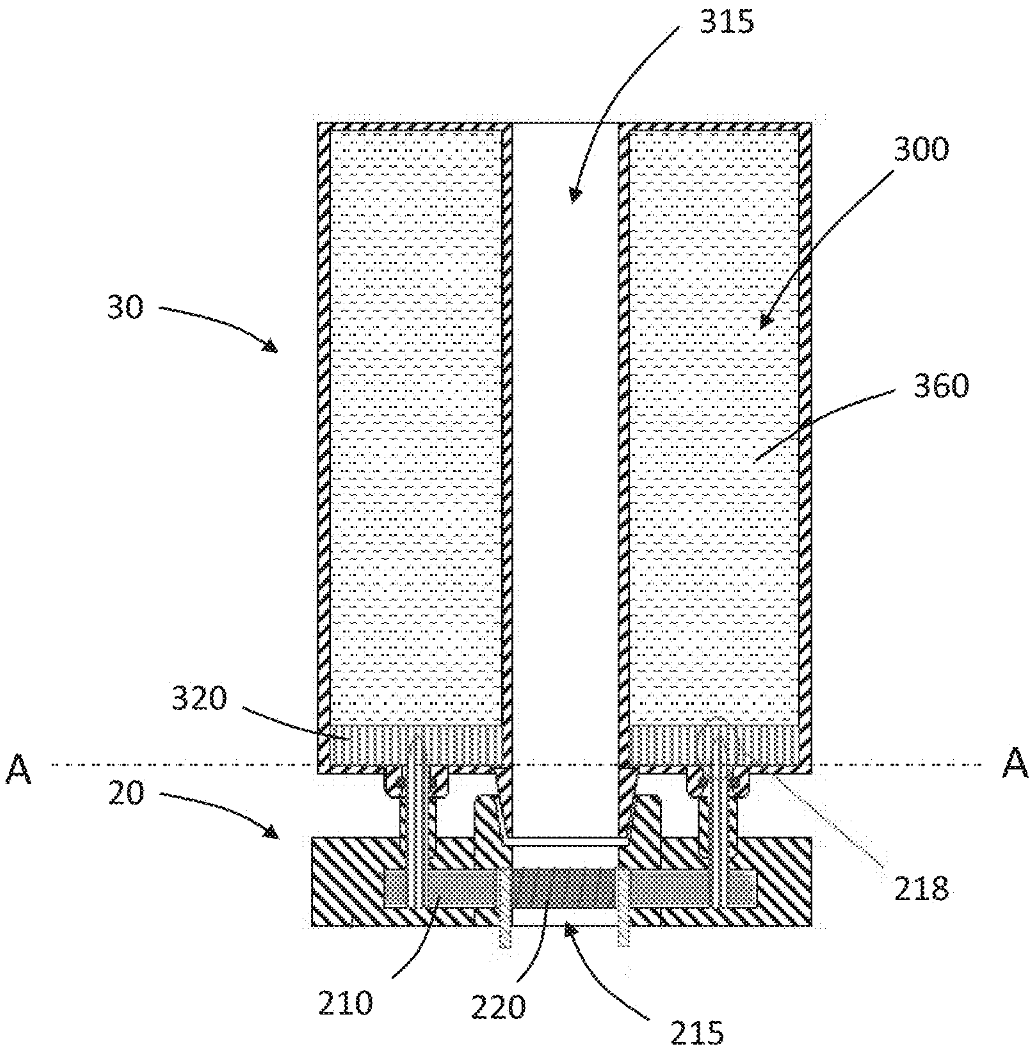
FIG. 4 is a schematic sectional view of a capsule connected to a vaporizing unit according to an example embodiment.

Referring now to FIG. 4, an example of a connected capsule 30 and vaporizing unit 20 is shown. The protruding portion of the liquid transfer element 218 extends through the port of the capsule beyond the bottom interior surface (indicated by line A-A) of the reservoir 300 and into, but not through, the layer of high retention material 320 in the reservoir 300. The reservoir 300 contains free-flowing liquid aerosol-generating substrate 360 that wets the layer of high retention material 320. The protruding portion of the liquid transfer element 218 carries liquid aerosol-generating substrate 360 to the portion of the liquid transfer element 210 that is in contact with heating element 220. Heating element 220 heats the substrate carried by the liquid transfer element 210 to generate an aerosol which may be carried by air through the passages 215, 315.

Figure 5A:
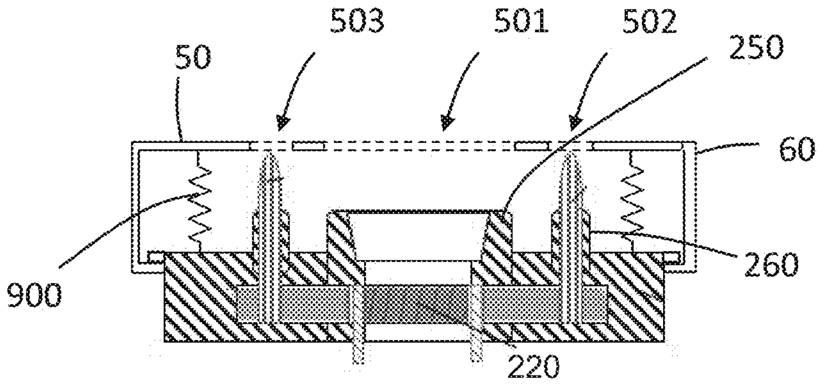
FIGS. 5A-B are schematic sectional views of a vaporizing unit having a longitudinally-moveable baffle according to an example embodiment.
Figure 5B:
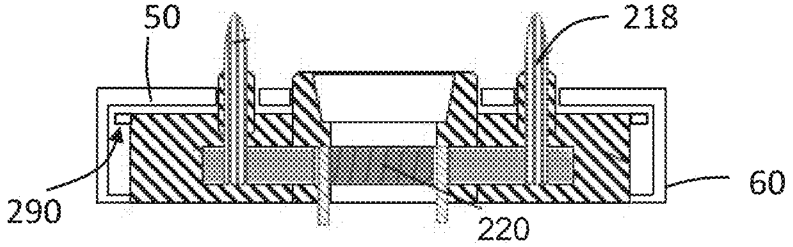

Referring now to FIGS. 5A-B, a vaporizing unit 20 may include a baffle 50 configured to protect, for example, projecting portions of the liquid transfer elements 218. The baffle 50 may extend (FIG. 5A) and retract (FIG. 5B). The baffle 50 may be biased towards the extended position by spring elements 900 (shown schematically) and application of force to move the first mating end of the capsule towards the second mating end of the vaporizing unit causes baffle 50 to retract. Baffle 50 includes openings 501, 502, 503 that are aligned with features of the mating end of the vaporizing unit 20. For example, openings 502 and 503 are aligned with annular members 260, and opening 501 is aligned with central annular member 250. When the baffle 50 is retracted, features of the mating end of the unit and the protruding elements of the liquid transfer element 218 extend through the openings 501, 502, 503 of the baffle 50. Baffle 50 may be coupled with, or may be integrally formed with, annular member 60 that may cooperate with the housing of the vaporizing unit to maintain alignment of the openings 501, 502, 503 of the baffle 50 with the features of the mating end of the unit while the baffle 50 extends and retracts. For example, a distal portion of the annular member 60 may cooperate with a detent 290 on the housing of the vaporizing unit 20.

Figure 6A:
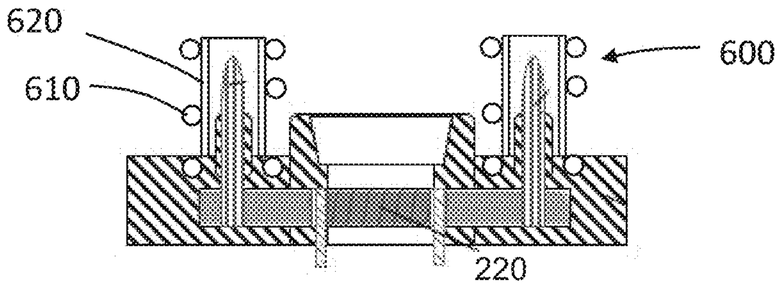
FIGS. 6A-B are schematic sectional views of a vaporizing unit having retractable sheaths according to an example embodiment.
Figure 6B:
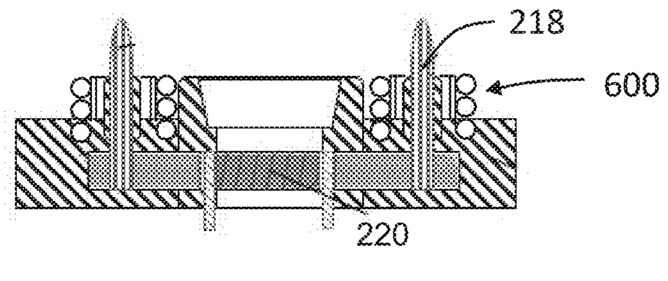

Referring now to FIGS. 6A-B, a vaporizing unit may include retractable sheaths 600, which may protect projecting portions of the liquid transfer element 218 when the vaporizing unit is not connected to the capsule. The sheaths 600 include a biasing element such as a spring 610 and a material 620 attached to the spring 610. The spring 610 biases the material 620 in an extended position (FIG. 6A). Application of force to move the first mating end of the capsule towards the second mating end of the vaporizing unit causes spring 610 and material 620 to retract (FIG. 6B).

Figure 7A:
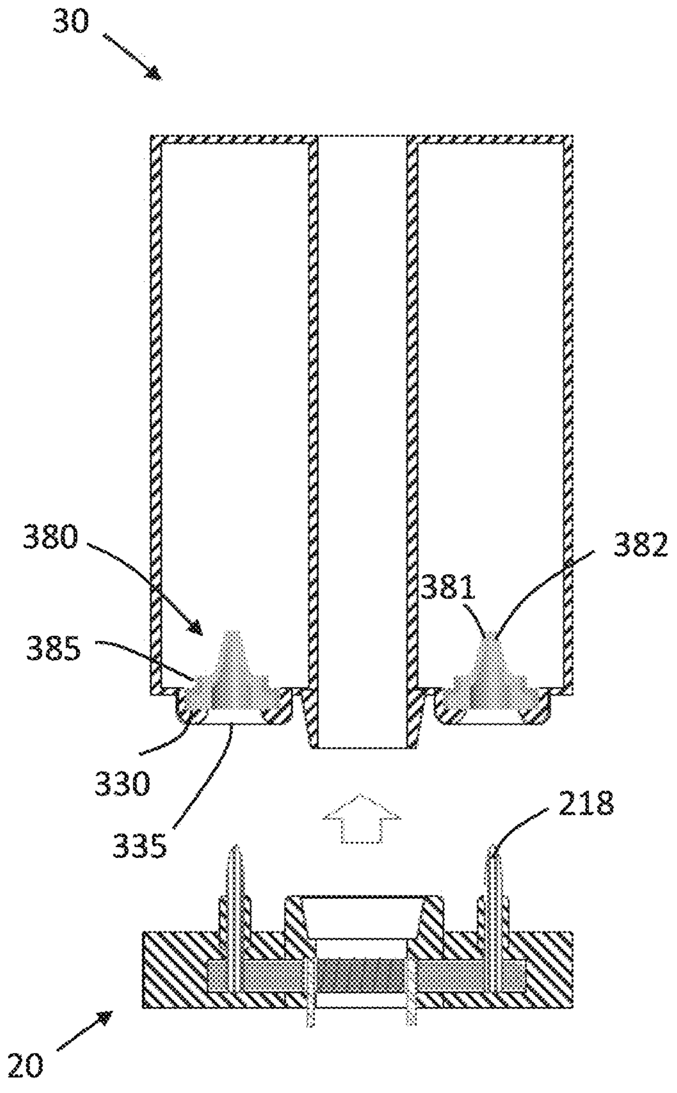
FIGS. 7A-B are schematic sectional views of a capsule and a vaporizing unit according to an example embodiment, wherein the capsule and vaporizing unit are disconnected (FIG. 7A) and connected (FIG. 7B).
Figure 7B:
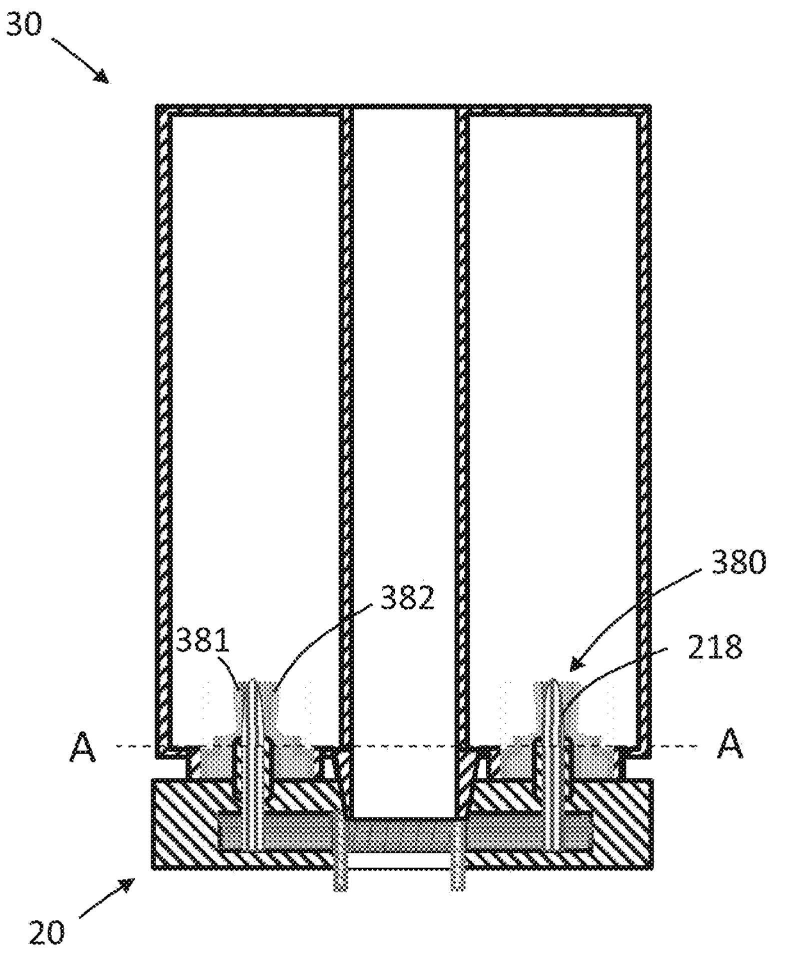

Referring now to FIGS. 7A-B, capsule 30 may include a valve 380 configured to prevent flow of aerosol-generating substrate (not shown) from the reservoir through port 330 when the vaporizing unit 20 is not connected to the capsule 30 (FIG. 7A) and to allow flow when the vaporizing unit 20 is connected to the capsule 30 (FIG. 7B). The valve 380 may be seated in a seal 385 within port 330. The valve 380 includes first 381 and second 382 resilient closing members biased in a closed position to prevent flow of fluid from the reservoir through the valve. The depicted resilient closing members 381, 382 each include a flat portion that engages the flat portion of the other member to close the valve 380. When the vaporizing unit 20 is connected to the capsule 30, the protruding portion of the liquid transfer element 218 pierces the cover or sealing element 335 disposed over port 330 and extends beyond the inner surface (indicated by line A-A) of the reservoir. The protruding portion of the liquid transfer element 218 pierces sealing element 335 disposed across port 330 and inserts into valve 380, causing resilient closing members 381, 382 to deflect away from their biased closed positions to cause the valve 380 to open and to place the protruding portion of the liquid transfer element 218 in fluidic communication with reservoir. The depicted valve 380 is a duckbill valve that is closed when protruding portion of the liquid transfer element 218 is not inserted in the valve 380. However, any suitable valve may be employed. The valve is mechanically actuatable and is configured to be opened when the vaporizing unit 20 and capsule 30 are connected and is configured to be closed when the vaporizing unit and capsule are not connected.

Figure 8:
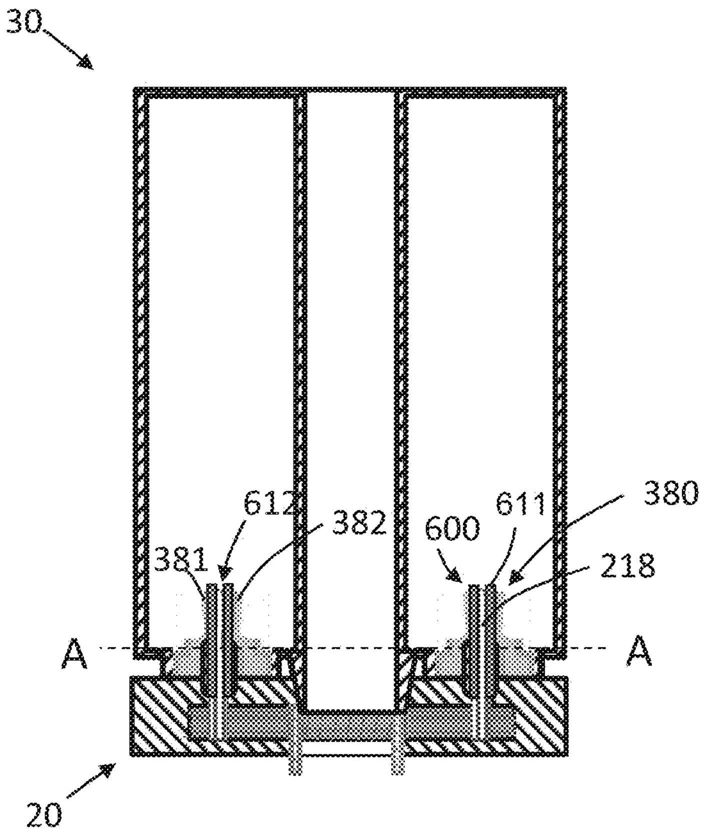
FIG. 8 is a schematic sectional view of a connected capsule and vaporizing unit according to an example embodiment.

Referring now to FIG. 8, an example of a connected capsule 30 and vaporizing unit 20 are shown. The capsule 30 and vaporizing unit 20 are similar to those depicted in FIGS. 7A-B, except that a protective sheath 600 is disposed about the liquid transfer element 218. The sheath 600 comprises a side wall 611 defining a proximal opening 612. In the depicted example, the side wall 611 of the sheath 600 contacts resilient closing members 381, 382 to cause the valve 380 to open. Liquid aerosol-generating substrate may flow from the reservoir through the proximal opening 612 to the liquid transfer element 218.

Figure 9:
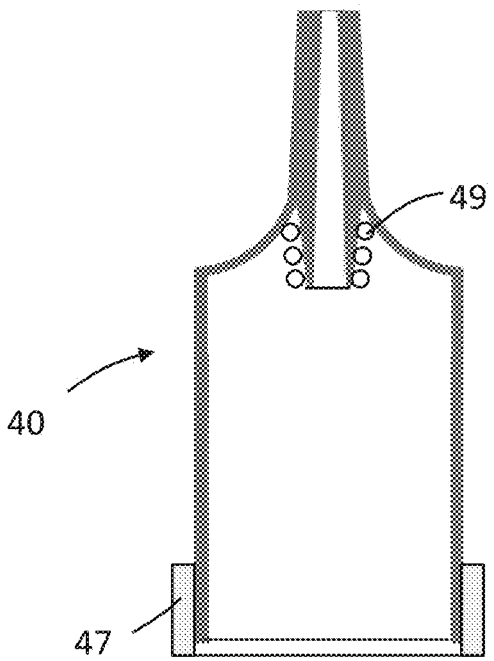
FIG. 9 is a schematic sectional view of a cover according to an example embodiment.

Referring now to FIG. 9, an example of a cover 40 is shown. A spring 49 is disposed in the cover and may assist in applying pressure to the capsule and vaporizing unit when the cover 40 is connected to the battery assembly. The depicted cover 40 also includes a connection element 47 for connecting the cover 40 to the battery assembly.

Figure 10:
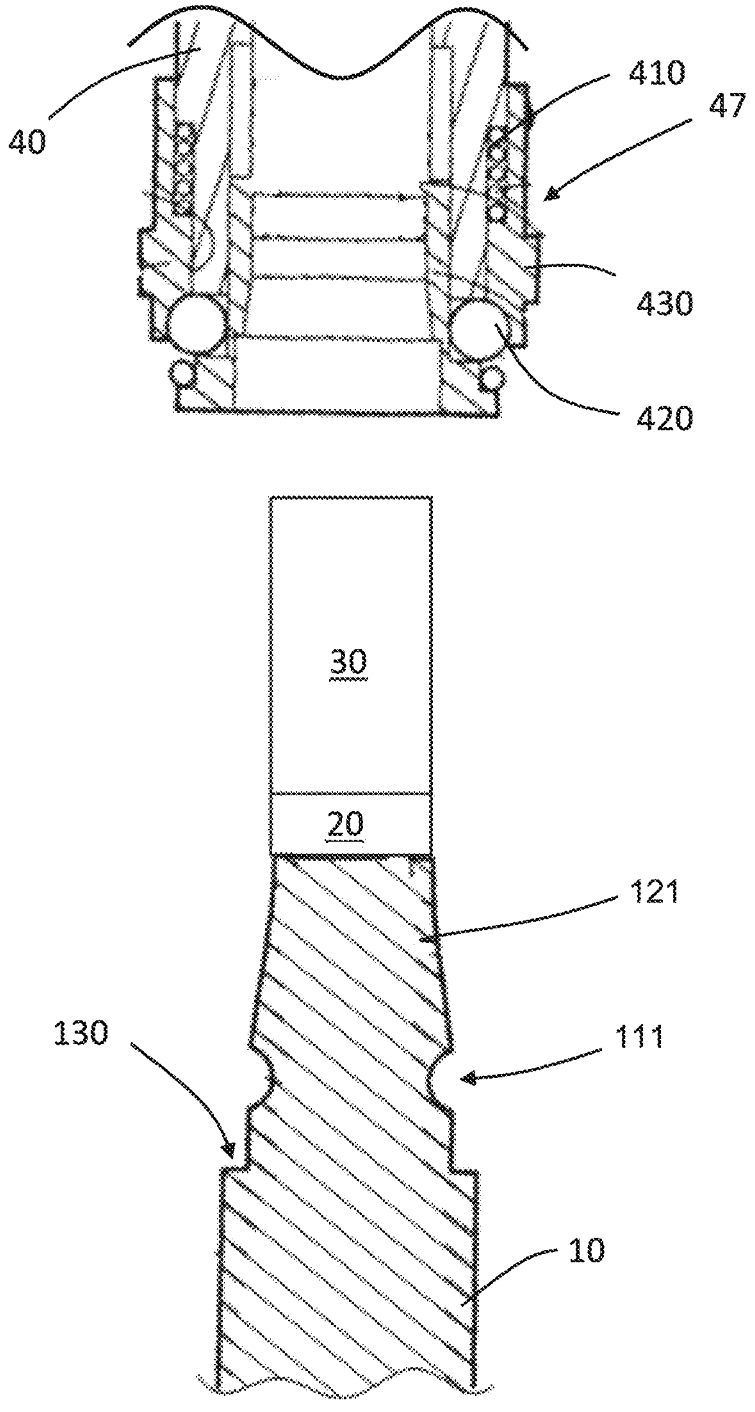
FIG. 10 is a schematic sectional view of a mechanism for coupling a cover to a battery assembly according to an example embodiment.

Referring now to FIG. 10, an example of a connection mechanism between a battery assembly 10 and a cover 40 is shown. The connection mechanism may be a quick release-type connection mechanism. For example, a proximal portion 121 of the housing of the battery assembly 10 may be tapered for insertion into a distal portion of the cover 40, which is also configured to be disposed over vaporizing unit 20 and capsule 30, which are shown connected to the battery assembly 10. The housing of the battery assembly includes indents 111 for cooperating with engagement member or annular element 420 of connection element 47. The housing 130 of the battery assembly also includes a rim against which a distal portion of the connection element 47 may abut when the cover 40 is connected with the battery assembly 10. The connection element 47 includes a slidable annular member 430 that may be retracted to allow disconnection of the cover 40 and the battery assembly 10. The slidable annular member 430 is biased in an extended position by spring 410 that cooperates with the housing of the cover. The quick release-type connector depicted in FIG. 9 is shown merely for purposes of illustration, and it will be understood that any suitable connector may be used for connecting battery assembly to cover.

Figure 11:
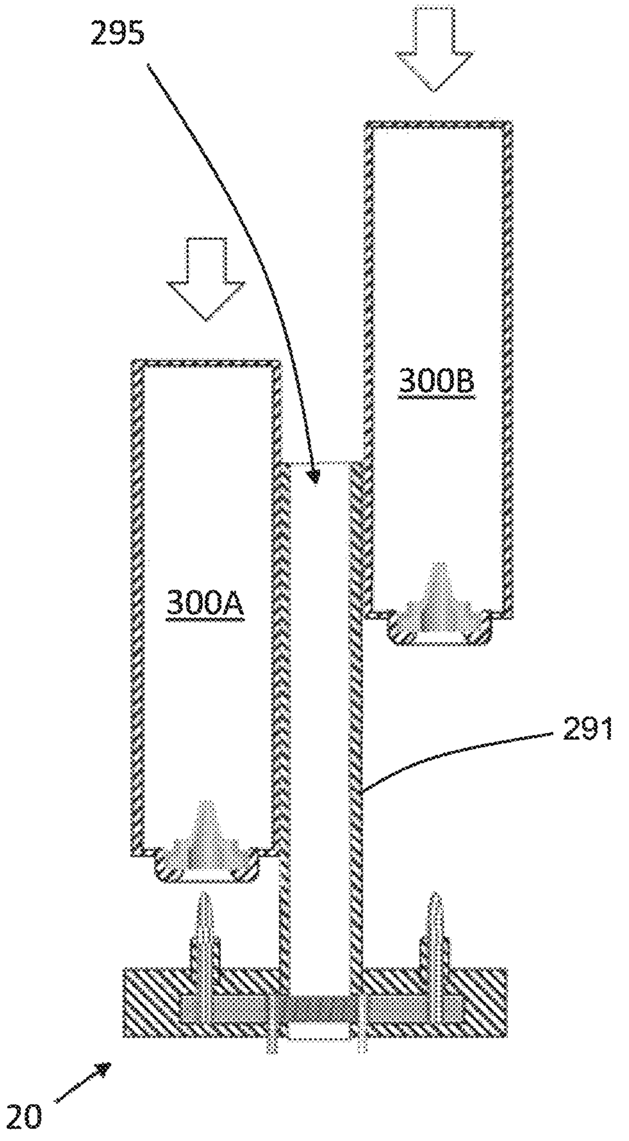
FIG. 11 is a schematic sectional view of two capsules and a vaporizing unit to which the capsules are connectable according to an example embodiment.

Referring now to FIG. 11, a system according to example embodiments may include more than one capsule 300A, 300B releasably coupleable to a vaporizing unit 20. In the depicted embodiment, the vaporizing unit 20 includes a longitudinally extending annular or cylindrical member 291 that forms a passage 295 through which aerosol may flow. The annular or cylindrical member 291 may also serve to guide capsules 300A, 300B into proper alignment for connection with vaporizing unit. The capsules 300A, 300B may contain the same or different liquids.

Figure 12:
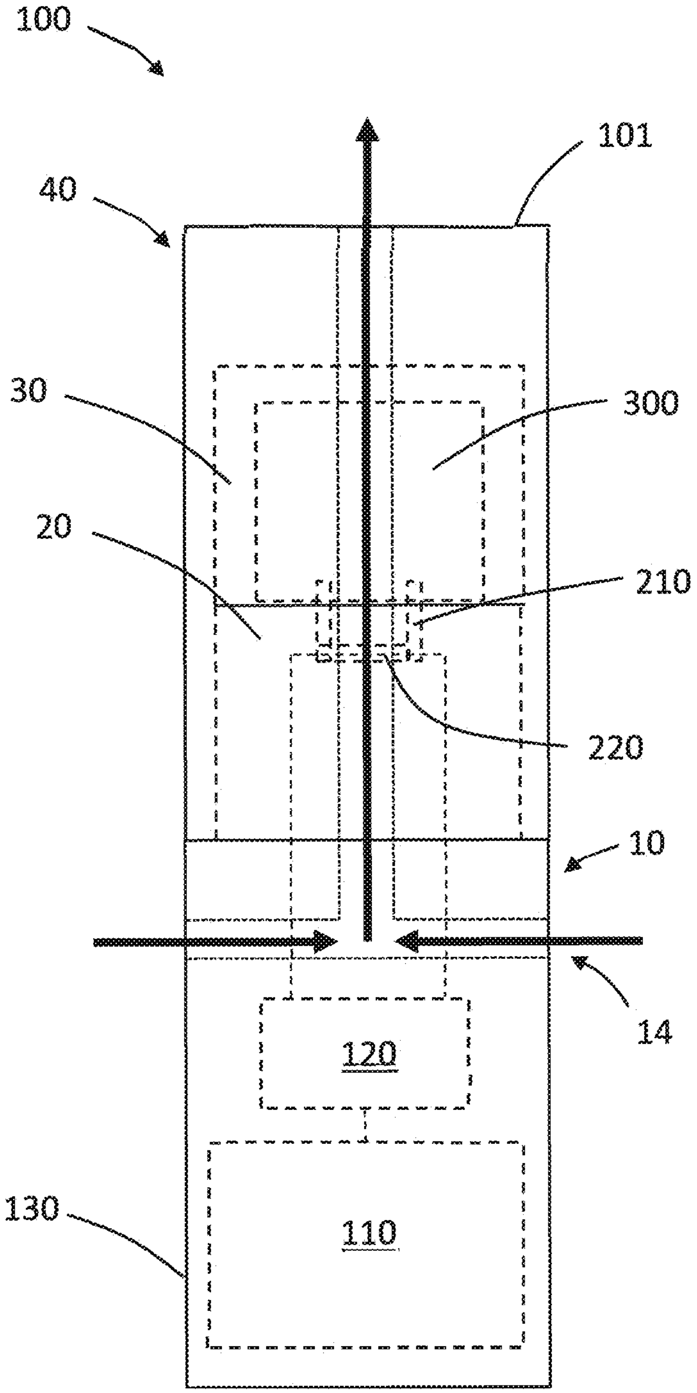
FIG. 12 is a schematic side view of an aerosol-generating system showing some internal components in dashed lines and an aerosol flow path in solid arrows according to an example embodiment.

Referring now to FIG. 12, an aerosol-generating system 100 includes a battery assembly 10, an vaporizing unit 20 releasably coupleable to the battery assembly 10, a capsule 30 releasably coupleable to the vaporizing unit 20 and a cover 40 releasably coupleable over the vaporizing unit 20 and the capsule 30.

The battery assembly 10 comprises a housing 130 in which a power supply 110 and electronic circuitry 120 are disposed. The electronic circuitry 120 is electrically coupled to the power supply 110. The vaporizing unit 20 comprises a liquid transfer element 210 and a heating element 220. The liquid transfer element 210 is in thermal connection with the heating element 220. When the vaporizing unit 20 is connected to the battery assembly 10, the heating element 220 is electrically coupled with the electronic circuitry 120 and power supply 110. When the vaporizing unit 20 is connected to the capsule 30, the liquid transfer element 210 is fluidly coupled with the reservoir 300 suitable to contain an aerosol-generating substrate. When a negative pressure is applied to the mouth end 101 of the system, which is defined by the cover 40, air may enter air inlets 14 in housing of battery assembly, may flow through a passage in battery assembly 10, through a passage in vaporizing unit 20 (such as passage 215 depicted in FIG. 3A) where aerosol may be entrained in the air, through a passage in the capsule 30 (such as passage 315 depicted in FIG. 2A), through a passage in the cover and through a mouth-end opening.

Thus, methods, systems, apparatuses, assemblies, and articles for aerosol-generating systems having separate capsules and vaporizing units are described. Various modifications and variations will be apparent to those skilled in the art without departing from the scope and spirit of the present disclosure. Although various examples have been described, it should be understood that the present disclosure should not be unduly limited to such embodiments. Indeed, various modifications of the described modes for carrying out the teachings which are apparent to those skilled in the mechanical arts, electrical arts, and aerosol-generating article manufacturing or related fields are intended to be within the scope of the following claims.

The invention claimed is:

1. A capsule of an aerosol-generating system, comprising:

a first housing defining a reservoir having an opening in a bottom surface of the reservoir, the reservoir configured to contain an aerosol-generating substrate, the opening leading to a port that extends away from the bottom surface of the reservoir, the port having a smaller cross-sectional flow area than the reservoir;

retention material along the bottom surface of the reservoir and covering a first side of the opening such that the first side of the opening is obstructed by the retention material, the retention material configured to transfer the aerosol-generating substrate within and through the retention material based on capillary action; and a sealing element across a second side of the opening opposite the first side, the sealing element defining the port when pierced to release the aerosol-generating substrate.

2. The capsule according to claim 1, wherein the sealing element is configured to be pierceable.

3. The capsule according to claim 1, wherein the retention material is configured to retain the aerosol-generating substrate such that the aerosol-generating substrate is prevented from traversing the retention material to the opening without an aide.

4. The capsule according to claim 1, wherein the retention material is entirely within the first housing.

5. The capsule of claim 1, wherein the retention material is configured to transfer the aerosol-generating substrate when engaged with a liquid transfer element that does not extend through the retention material.

6. An aerosol-generating system comprising:

a capsule configured to contain an aerosol-generating substrate including retention material along a bottom surface of the capsule and covering a first side of an opening on the bottom surface of the capsule such that the first side of the opening is obstructed by the retention material, the opening leading to a port that extends away from the bottom surface of the capsule, and a sealing element across a second side of the opening opposite the first side, the sealing element defining the port configured to release the aerosol-generating substrate when pierced; and a vaporizing unit configured to be releasably connected to the capsule, the vaporizing unit including a second housing, a transfer element, and a heating element, the second housing including a proximal side, an opposing distal side, and an elongate element extending from the proximal side, the elongate element of the second housing of the vaporizing unit configured to pierce the sealing element of the capsule and extend partially through the retention material such that the elongate element transports the aerosol-generating substrate through the retention material and out of the capsule.

7. The system according to claim 6, wherein the retention material is configured to prevent the aerosol-generating substrate from traversing the opening based on the elongate element being disengaged with the capsule.

8. The system according to claim 6, further comprising:

a cover configured to be disposed over the capsule and the vaporizing unit.

9. The system according to claim 6, further comprising:

a sheath surrounding the transfer element.

10. The system according to claim 9, wherein the sheath is a retractable sheath.

11. The system according to claim 10, wherein the sheath includes a biasing element, the sheath being configured to retract upon application of force to expose the transfer element.

12. The system according to claim 6, wherein the retention material is entirely within the capsule.

13. The system according to claim 6, wherein the elongate element extends only partially through the retention material.

* * * * *